United States Patent [19]
Persson

[11] 3,992,227
[45] Nov. 16, 1976

[54] DRY CELL BATTERY CONTACTOR

[76] Inventor: Russell C. Persson, 661 San Felipe St., Salinas, Calif. 93901

[22] Filed: Sept. 29, 1975

[21] Appl. No.: 617,363

[52] U.S. Cl. .............................. 429/121; 339/95 R; 174/126 R
[51] Int. Cl.² ........................................ H01M 2/20
[58] Field of Search ............... 136/134 P, 110, 173, 136/181; 240/10.6, 10.68; 339/95 R

[56] References Cited
UNITED STATES PATENTS

| | | | |
|---|---|---|---|
| 2,449,568 | 9/1948 | Shriro et al. ........................ | 136/173 |
| 2,983,899 | 5/1961 | Amodia et al. ...................... | 136/110 |
| 3,196,204 | 7/1965 | Gates ................................... | 339/95 R |
| 3,299,262 | 1/1967 | Duncan .............................. | 240/10.6 R |
| 3,748,185 | 7/1973 | Cooper et al. ...................... | 136/181 |
| 3,923,549 | 12/1975 | Mabuchi et al. ................. | 136/134 P |

*Primary Examiner*—Donald L. Walton
*Attorney, Agent, or Firm*—Thomas H. Olson

[57] ABSTRACT

An article of manufacture and method for enhancing the operability of appliances such as flashlights that are powered by dry cell batteries, including a mass of conductive shavings and a flexible insulative disc for supporting the shavings between terminal ends of the batteries when they are in place in an appliance.

12 Claims, 12 Drawing Figures

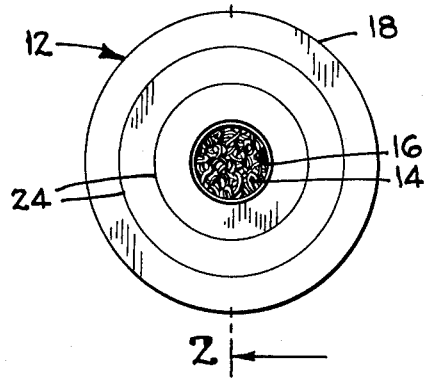
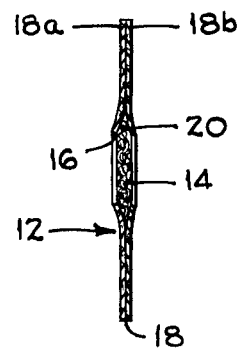
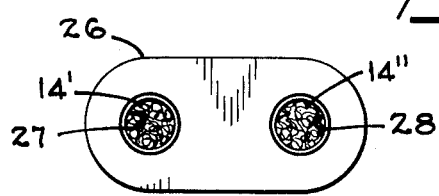
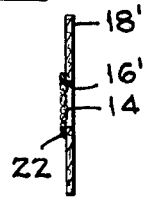
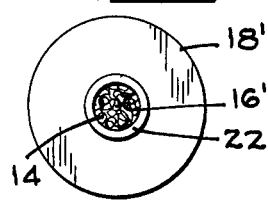
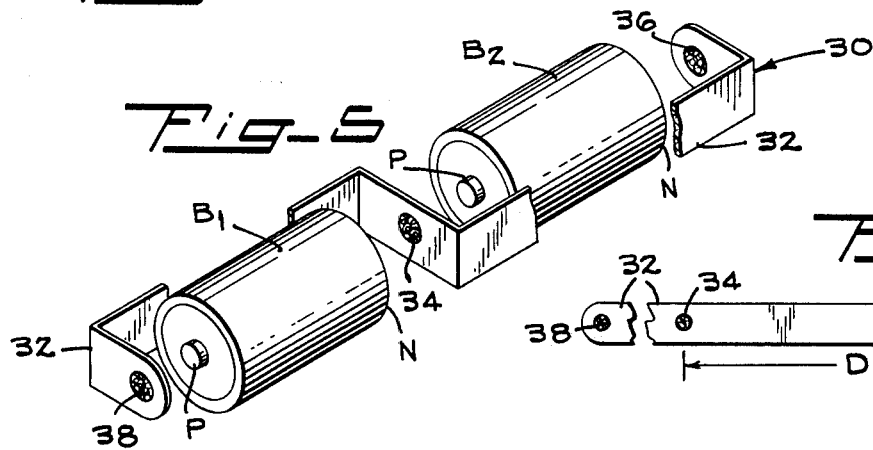
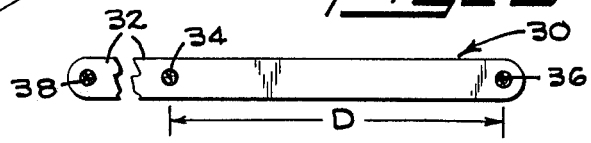
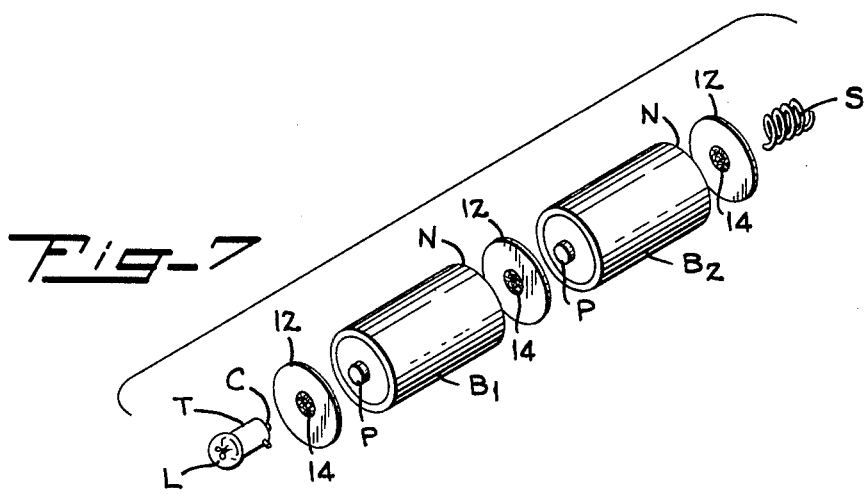

Fig_8
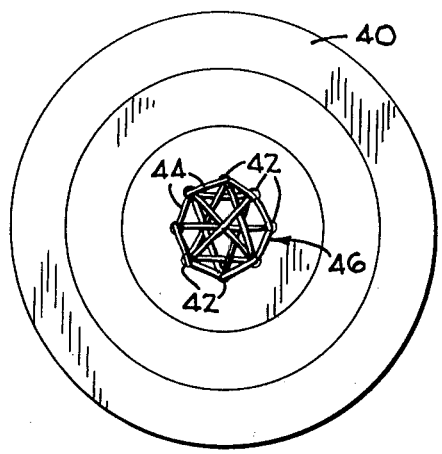
Fig_8A
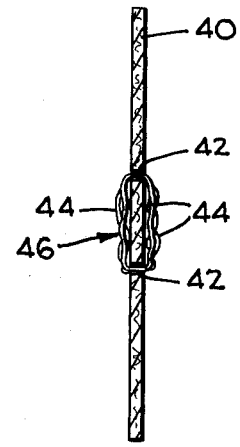
Fig_9
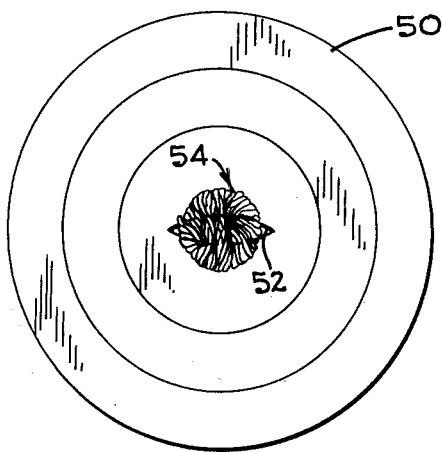
Fig_9A
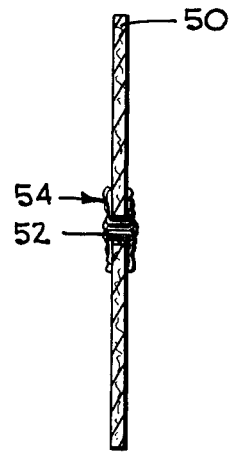

DRY CELL BATTERY CONTACTOR

BACKGROUND OF THE INVENTION

1. Field of the Invention

This invention relates to a dry cell battery contactor and method for enhancing the conductive path between two or more batteries in an appliance and between the batteries and electrical terminals within the appliance.

2. Description of the Prior Art

U.S. Pat. No. 2,887,861 discloses a conductive disc installed in a flashbulb gun for abrading and cleaning a flashbulb terminal each time a new bulb is installed in the gun.

U.S. Pat. No. 3,316,396 discloses a sponge disc for placement in a flashlight to replace the helical coil spring that is normally employed for establishing contact to the negative terminal of a flashlight battery.

U.S. Pat. No. 3,662,166 discloses a body of foam material in which electrically conductive particles are embedded. The patented members are intended for replacement of the helical coil spring typically incorporated in flashlights and like appliances.

SUMMARY OF THE INVENTION

Dry cell storage batteries of the type employed in flashlights, portable radios, portable tape recorders, and like electrical appliances are of cylindrical form and include a positive circular terminal post at one end and a circular metallic surface at the other end which forms the negative terminal. The terminal post is of relatively small diameter and the circular surface is of relatively large diameter, substantially coextensive with the diameter of the cylindric battery casing. The surfaces of the positive post and the negative terminal are subject to oxidization both on the shelf and in the appliance. Such oxidization forms a relatively high resistance electrical circuit point where the positive terminal post of one battery contacts the negative terminal of another battery as well as where the batteries contact the circuit connections of the appliance in which they are installed. It is believed common experience for one to attempt to use a flashlight known to have fresh batteries only to find that the flashlight can be rendered operable only after vibrating or banging the flashlight against a solid object. Such vibration or banging is thought to cause relative movement between two contacting battery portions which relative movement partially pierces oxide coatings formed on the battery terminal surfaces. Such vibration of the appliance and the batteries is but a temporary cure for the problem, because the oxide coating is only partially penetrated by such action. These problems are not only frustrating to the user of the appliance but are wasteful in that batteries are often discarded because of formation of such oxide coating and not because their stored energy has been totally expended.

An object of the present invention is to provide a battery terminal contactor which can be installed in flashlights and like portable appliances to eliminate the above described problem without requiring any modification of the appliance. Accordingly, the invention can be utilized by those with no technical ability beyond the ability to place batteries in the appliance.

The preferred embodiment that is described below in detail includes a quantity or mass of conductive metallic shavings or turnings, which mass is relatively flat and has a diameter approximating that of the positive battery terminal post. The mass is retained in a correspondingly shaped opening in a disc shaped member formed of flexible insulative material. The disc has an outer diameter preferably in excess of the diameter of the battery so that when the disc is installed in an appliace, e.g. a flashlight, the periphery of the disc touches the housing of the appliance and thus supports the conductive mass centrally of the housing and in alignment with the battery post.

The structure described in the next preceding paragraph affords attainment of the object of providing for continuous electrical contact with the terminals of dry cell batteries notwithstanding the tendency for oxidation to occur on such terminals. Attainment of this object follows from the structure of the invention because the conductive metal shavings preferably have rough edges which abrade or scratch through the oxide coating to establish an excellent low resistance circuit path at points of contact.

A further object of the invention is to provide a device of the character described that can be employed in appliances arranged for different sized batteries. This object is achieved by forming the above mentioned flexible disc of a size adequate to accommodate "D" size batteries and by providing on the disc one or more concentric rings or perforations so that the outer diameter of the disc can be reduced for installation in smaller casing which accommodate smaller sized batteries.

A further object is to provide a single device of the type described that is specifically adapted for employment in a flashlight or the like that has two dry cell batteries connected in series. This object is achieved by providing an insulative strip having an overall length equal to the sum of twice the axial length of the batteries and twice the diameter of the batteries and by providing three masses of conductive metal shavings at strategic locations in the strip. The center one of the three masses assures good contact between the two batteries and the end masses assure good contact respectively with the flashlight bulb typically at the positive end of the batteries and the helical compression spring typically at the negative end of the batteries.

Yet another object of the invention is to provide a method for employing the above described elements in enhancing the operability of battery operated appliances.

The foregoing together with other objects, features and advantages will be more apparent after referring to the following specification and the accompanying drawings.

BRIEF DESCRIPTION OF THE DRAWING

FIG. 1 is a front view of a dry cell battery contactor embodying the present invention.

FIG. 2 is a cross sectional view taken along line 2—2 of FIG. 1.

FIG. 3 is a front view of an alternate form of dry cell battery contactor embodying the invention.

FIG. 4 is a front view of still another form of contactor according to the invention.

FIG. 4A is a cross sectional view taken along a line extending diametrically of FIG. 4.

FIG. 5 is a perspective view of another form of a contactor according to the invention in association with two dry cell batteries.

FIG. 6 is a fragmentary front view at reduced scale of the embodiment of FIG. 5.

FIG. 7 is an exploded view of the contents of a typical flashlight housing employing the present invention.

FIG. 8 is a front view of yet another form of contactor embodying the invention.

FIG. 8A is a fragmentary cross sectional view taken along a vertical diametrically extending line from FIG. 8.

FIG. 9 is a side view of a further embodiment of the invention.

FIG. 9A is a cross sectional view taken along a vertically extending diametrical line from FIG. 9.

DESCRIPTION OF THE PREFERRED EMBODIMENT

Referring to FIG. 7, an exploded view of the internal parts of a typical flashlight, there is a pair of dry cell batteries $B_1$ and $B_2$ each of which has a positive terminal post P that protrudes from one end of the battery and has a diameter substantially less than the diameter of the battery. The opposite end of the battery forms the negative terminal end of the battery and is a circular metal plate having a diameter substantially coextensive with that of the battery. As is conventional at the negative end of the housing of the flashlight or like appliance, there is a conductive helical coil spring S which establishes contact between the negative terminal end of the battery $B_2$ and the flashlight case or like electrical connecting point. A typical flashlight also includes a bulb or lamp L which contacts positive terminal post P of battery $B_1$ at a central contact C in the lamp. The electrical circuit to lamp L is completed through a switch and through the case of the flashlight (not shown) between tubular conductive portion T of lamp L and spring S whereupon the filament in lamp L is energized. According to the present invention battery contactors 12 are placed at each circuit point where connection is established with or between the batteries $B_1$ and $B_2$.

Referring to FIG. 1 contactor 12 includes a mass 14 of conductive shavings or turnings that form an important element of the invention. The savings are preferably copper, an excellent electrical conductor, and can be a plurality of intertwined strips of such material of the type exemplified in pot scrubbing pads that are and have been for some time available on the market. Such strips are typically copper sheet material having a width of 1/16 inch more or less and a thickness of about ten thousandth of an inch or so, the thickness being roughly one order of magnitude less than the width of the individual copper strips or turnings. Such strips typically have rough or burred edges which have an abrasive quality that the present invention exploits.

Mass 14 can have a diameter in the range of approximately ¼ to ⅜ inches, a diameter that is equal to or greater than the positive terminal post P of a battery B. Mass 14 is supported in an opening 16 formed in a disc 18. Disc 18 is constructed of semi flexible insulative material such as plastic, plastic coated woven cloth, leather, or like material having the requisite characteristics. The outer periphery of disc 18 is concentric with the portion of the disc that defines opening 16.

Mass 14 is retained centrally within opening 16 in one of several ways. In the embodiment of FIG. 2, disc 18 is of laminated construction formed of two separate laminae 18a and 18b. The segments are congruent to one another and are glued or otherwise secured to one another throughout their entire outer portions with the exception of an annular space 20 which bounds opening 16. Laminae 18a and 18b are semi flexible by which is meant that they form a disc 18 that has sufficient resilience that mass 14 is retained or captured in the annular space 20 by compressive forces from the material of which the disc is made.

An alternate form of construction shown in FIGS. 4 and 4A employs a disc 18' of single layer construction centrally of which is defined a circular opening 16'. There is a mass of conductive strips 14 which is retained in spanning relation of opening 16' by an annular bead of adhesive 22. Adhesive 22 is preferably a thermoplastic adhesive or the like that retains at least a moderate degree of flexibility after it sets up. In both the embodiments of FIGS. 1 and 2, and of FIGS. 4 and 4A, mass 14 is retained within opening 16 so that when the contactors 12 are positioned as shown in FIG. 7 the mass will be in alignment with the central cylindric axis of the assembled parts and of the flashlight housing or whatever other appliance in which the batteries and contactors are installed.

It can be appreciated that to install the contactors 12 of the invention one need only remove one of the caps such as exist at one or both ends of a flashlight or otherwise gain access to the batteries. The batteries are removed and a contactor 12 is placed at each end of the series of batteries and also between each pair of adjacent batteries. In the case of a two cell appliance, exemplified in FIG. 7, three contactors 12 can be employed to advantage. Because mass 14 is composed of conductive material that has an abrasive quality, it rubs or abrades through any oxide coatings or the like that may be present on battery terminals P or N or on lamp contact C or spring S. The electrical contact is enhanced should the appliance be subject to any degree of vibration because such vibration causes relative movement between the strips or turnings in mass 14 and the battery terminal which it contacts. Such vibration has not been found essential however since the edges of the strip in mass 14 are typically sharp enough the cut through or abrade the very thin oxide coating present on most batteries and deleterious to good electric contact.

FIG. 7 is proportioned to represent "D" size battery cells which are typically about 1 ¼ inches in diameter and approximately 2 ¼ inches in length. The invention is equally suitable for other size batteries, such as "C" size batteries which have a diameter of about 1 inch and a length of about 1 ⅞ inches. For adapting a single battery contactor configuration to numerous size cells it is possible to fold over or otherwise deform the peripheral margin of disc 18. If disc 18, however, is constructed of material of slight flexibility or if the battery container for a given appliance is constructed to extremely close tolerances, the invention provides one or more concentric lines 24 on one or both surfaces of disc 18. Lines 24 can simply be imprinted or embossed on disc 18 to form a guide for one to trim off the outer portion of the disc to adapt a contactor to a smaller size battery. Alternatively lines 24 can be perforations whereby one can reduce the size of disc 18 without employment of scissors or other like tools. In any event te device can be readily adapted for use in appliances requiring different size batteries.

The modification of FIG. 3 illustrtes how the invention can be adapted to certain appliances that employ two rows of batteries supported in juxtaposition and connected electrically either in parallel or in series. In the embodiment of FIG. 3 is a first mass of conductive metal turnings 14' and a second mass 14". The material of which the masses are formed is identical to that described hereinabove. A supporting member 26 of semi flexible insulative material of the type described hereinabove in connection with FIGS. 1 and 2 is provided with two openings 27 and 28 in spanning relation of which masses 14' and 14" are retained. Openings 27 and 28 are of a diameter corresponding to the diameter of positive terminal post P on the battery and are spaced symmetrically of the center line of support body 26 by an amount approximating the radius of the batteries. Accordingly when the device of FIG. 3 is placed between batteries in an appliance, it establishes contacts at two juxtaposed battery rows, whereby te advantages of the invention are afforded in a convenient matter. Because supporting body 26 is insulative there is no current flow between mass 14' and mass 14".

The invention can also be embodied (see FIG. 5) in a single, one piece structure suited for certain standard flashlights and the like. For example a flashlight employing two "D" size batteries is by far the most common flashlight in use and the device shown in FIG. 5 is particularly adapted for employment in such flashlight. The device there depicted and identified generally at 30 includes an elongate strip of semi flexible insulative material 32 which has a width substantially greater than the diameter of central terminal post P of the battery but less than the overall diameter of the battery. Centrally of strip 32 is supported a mass of metallic conductive shavings 34 identical to that described hereinabove in conjunction with FIG. 1 and identified by reference numeral 14. Symmetrical of the center of strip 32 at which mass 34 is supported are two additional masses of conductive metallic shavings 36 and 38, the latter masses being identical in structure and arrangement to that described hereinabove. Masses 36 and 38 are equally spaced from mass 34 by a distance indicated in FIG. 6 at D. The dimension D is equal to the length of the battery plus twice the radius of the battery so that when strip 32 is installed as shown and lies along the outer surface of the battery, masses 34, 36 and 38 will be properly positioned to effect good electrical contact to the battery terminals. The embodiment of FIGS. 5 and 6 is merely exemplary of an elongate strip having a plurality of conductive masses retained therein at intervals spaced from one another by the distance D so that a device exemplified at 30 can be provided for two cell flashlights or three cell flashlights or four cell flashlights or virtually any other structure for housing such batteries.

An alternate procedure for retaining the mass of conductive strands centrally of the disc is depicted in FIGS. 8 and 8A. A disc 40 having the characteristics described hereinabove in connection with disc 18 is employed and has in the center region thereof a plurality of small punched holes, only several of which are indicated in the drawing at 42. Threaded through holes 42 are strands 44 of the conductive material referred to hereinabove which forms a conductive mass 46. Threading or weaving the strands through the holes 42 provides for accomplishment of two functions, namely: the function of physically retaining the conductive mass centrally of disc 40 and the function of providing a conductive path over the strands through the otherwise non-conductive disc. In FIG. 8A mass 46 is shown somewhat enlarged for purposes of clarity, the actual operative embodiment incorporating a mass of strands that is substantially flat to minimize the thickness dimension of the contactor constructed according to FIGS. 8 and 8A.

It is not absolutely essential that holes 42 be prepunched centrally of disc 40. A satisfactory alternative is to place a single conductive strand in the eye of a needle and to thread the strand back and forth through disc 40, the needle piercing the material of the disc so as to admit strands 42 through the disc. As in the embodiment depicted in FIG. 8 this form of the invention effects retention of the conductive mass centrally of the disc and provides a conductive path through the otherwise insulative disc.

FIGS. 9 and 9A depict still another procedure for retaining the conductive mass centrally of the insulative disc. An insulative disc 50 having properties and characteristics as described hereinabove is centrally slitted at 52. The diametrical extent of slit 52 is approximately equal to or less than the diameter of positive battery post P. Because the individual strands forming conductive mass 54 are flexible, the mass can be stretched out or elongated, introduced through slit 52 until the portions of the mass on opposite sides of disc 50 are approximately equal, and then compressed and formed so that generally circular portions of the mass reside on each side of the disc in a shape generally concentric to the external periphery of the disc. The moderate degree of elasticity in the strands forming mass 54 is sufficient to retain the mass in place within slit 52 and the strands extending through this slit assure a conductive electrical path between opposite sides of the otherwise insulative disc 50.

A substantial equivalent to the embodiment specifically depicted in FIGS. 9 and 9a is to punch out a small circular or other shaped opening centrally of the disc. The mass of strands is stretched out or elongated, introduced through the opening in the disc until the portions on opposite sides of the disc are approximately equal and then compressed axially of the disc so as to afford retention of the strands on the disc and to form a conductive path through the otherwise insulative disc. Doubtless other techniques for retaining the conductive mass centrally of the disc and for providing a conductive path through the disc will occur to those skilled in the art without departing from the invention as defined in the appended claims It will thus be seen that the present invention provides a battery contactor which eliminates erratic appliance operation arising from the formation of oxide or other insulative coatings on battery terminal surfaces. The device can be produced at minimal expense and can be incorporated into existing appliances without any modification thereto and when installed assures uninterrupted operation of the appliance throughout the entire useful life of the battery. Moreover, the frustration of having to jiggle or impact a flashlight or like appliance to cause it to operate properly is eliminated by the invention. The specific embodiments described hereinabove and shown in the drawings are to be considered as only exemplary, because it will be obvious that other adaptations and modifications can be made without departing from the true spirit and scope of the invention.

What is claimed is:

1. An article of manufacture for enhancing connection to one of the terminals of a cylindric dry cell battery of the type having a circular post at one axial end thereof for establishing connection to one terminal of the battery, the other terminal being on the opposite axial end, said article of manufacture comprising a mass of conductive shavings, said mass being of generally circular shape and having a diameter greater than the central terminal and less than the cylindric diameter of the battery, and means for supporting said mass in alignment with said circular terminal, said supporting means being formed of insulating material having first and second parallel faces spaced from one another by a distance less than the axial extent of said mass, said mass having portions extending between the faces of said supporting means to establish electrical contintuity between opposite axial extremities thereof.

2. An article of manufacture according to claim 1 wherein said conductive material is copper in the form of strips having a width of about 1/16 inch and a thickness less than the width by about one order of magnitude.

3. An article of manufacture according to claim 1 wherein said supporting means comprises an elongate strip of flexible material having a length and a midpoint, said strip defining first and second openings symmetrically spaced from the midpoint of said strip, a second mass of conductive shavings, and means for retaining said masses in respective said openings so that the article can be employed in enhancing contact with the axial ends of two juxtaposed cylindric batteries each having a radius approximating the distance between the midpoint and the respective openings.

4. An article of manufacture according to claim 1 wherein said supporting means comprises an elongate strip of flexible insulative material defining an opening centrally thereof, means for securing said mass within said opening, said strip having first and second portions extending in opposite directions from said opening by an amount in excess of a distance D, each said strip portion terminating in a distal extremity, each said distal extremity defining a hole therein spaced from said opening by a distance D, and second and third masses of conductive shavings retained in respective said holes so that the article can be employed to enhance conductivity with and between two cylindric batteries that each have a diameter and a length such that the sum of the diameter and the length is substantially equal to the distance D.

5. An article of manufacture according to claim 1 wherein said supporting means comprises an insulative flexible disc, said disc defining centrally thereof an opening concentric of the circular mass and approximating the diameter of the mass, and means for retaining the mass to said disc within said opening.

6. An article of manufacture according to claim 5 wherein said retaining means comprises a second disc substantially congruent to first said disc, means for adhesively joining the outer portions of said discs to one another, the portions of said discs bounding said hole defining an annular space therebetween, the periphery of said mass being captured in said annular space.

7. An article of manufacture in accordance with claim 5 wherein said retaining means comprises a substantially continuous adhesive ring circumscribing said opening and adhesively joining the periphery of said mass to said disc at the margin of said opening.

8. An article of manufacture in accordance with claim 5 wherein said retaining means comprises a central portion of said disc defining a plurality of openings at least as large as the cross sectional dimension of said strands, said strands being woven back and forth through said openings and compressed substantially flat against said disc.

9. An article of manufacture in accordance with claim 5 wherein said retaining means comprises a central portion of said disc defining an opening substantially larger than the cross sectional size of said strands, a mass of said strands being disposed in said opening with substantially equal portions of said mass residing on opposite sides of said disc, said mass being compressed substantially flat against said disc on both sides thereof.

10. An article of manufacture according to claim 5 wherein said disc has an outer diameter slightly larger than about 1 ¼ inches and a ring formed on the surface of the disc concentric with the outer diameter thereof, said ring having a diameter of about 1 inch.

11. A method for enhancing the electric conductively of a power circuit including a pair of dry cell batteries housed in a cylindric case comprising the steps of providing mass of conductive shavings, and supporting said mass coaxially of and electrically insulated from said tubular housing and intermediate said dry cell batteries.

12. A method according to claim 11 wherein said supporting step comprises providing a flexible insulative disc having an outer diameter approximating that of the tubular housing, excising a central portion of the disc to form an opening therein, retaining the mass in the opening to afford access to said mass from both sides thereof.

* * * * *